United States Patent [19]

Kaelin et al.

[11] 3,909,788

[45]* Sept. 30, 1975

[54] DRIVING CIRCUITS FOR LIGHT EMITTING DIODES

[75] Inventors: George R. Kaelin, Woodland Hills; James A. Pellegrino, Thousand Oaks, both of Calif.

[73] Assignee: Litton Systems, Inc., Beverly Hills, Calif.

[ * ] Notice: The portion of the term of this patent subsequent to June 19, 1990, has been disclaimed.

[22] Filed: Sept. 20, 1973

[21] Appl. No.: 399,232

Related U.S. Application Data

[63] Continuation of Ser. No. 267,238, June 28, 1972, abandoned, which is a continuation-in-part of Ser. No. 184,076, Sept. 27, 1971, Pat. No. 3,740,570.

[52] U.S. Cl. ....... 340/166 R; 178/7.3 D; 340/324 R

[51] Int. Cl.² H04Q 9/00; H04N 5/38; G08B 23/00

[58] Field of Search .................. 340/166 R, 166 EL

[56] References Cited

UNITED STATES PATENTS 3,740,570 6/1973 Kaelin et al. ................. 340/166 EL

*Primary Examiner*—Donald J. Yusko

[57] ABSTRACT

LEDs are arranged in a matrix and driven by a pair of registers. A column register sequentially enables the columns of LEDs and a row register selectively operates the LEDs of each column in accordance with a predetermined binary code. A color control and a brightness control circuit may be included in connection with the row register to selectively control driving currents to the LEDs to control color hue, and to selectively control the duration of "on" time to control apparent brightness.

10 Claims, 5 Drawing Figures

DRIVING CIRCUITS FOR LIGHT EMITTING DIODES

This is a continuation, of application Ser. No. 267,238, filed June 28, 1972 now abandoned; and which application is a continuation-in-part of our co-pending application Ser. No. 184,076 filed Sept. 27, 1971, now U.S. Pat. No. 3,740,570 for "Driving Circuits For Light Emitting Diodes" and assigned to the same assignee as the present invention.

This invention relates to driving circuits for light emitting diodes, and particularly to circuits for driving light emitting diodes to achieve color display.

Light emitting diodes (LEDs) are useful for alphanumeric display purposes. LED arrays, when properly driven, can provide alpha-numeric read out of information from a computer. However, in prior LED arrays, the individual diodes were separately operated, so that driving circuits required for operating prior LED displays required numerous connections to the display. The number of connections to prior LED display arrays rendered such arrays cumbersome in use and often expensive to manufacture.

It is an object of the present invention to provide driving circuits for LED display arrays whereby the LEDs may be selectively operated.

It is another object of the present invention to provide a LED driving and memory circuit which may be integrated with a LED matrix to form LED display apparatus requiring fewer interconnections than heretofore achieved.

Certain LEDs exhibit different colors when subjected to driving currents of various amplitudes. Accordingly, it is yet another object of the present invention to provide a driving circuit for a LED matrix for selectively varying the driving currents to the individual LEDs of the matrix to achieve a selectable color display.

Another object of the present invention is to provide intensity control apparatus in multicolor LED display apparatus.

Another object of the present invention is to provide a LED driving circuit for selectively varying the pulse widths of driving current pulses to achieve selective intensity control of the LEDs.

In accordance with the present invention, a plurality of LEDs are disposed in a two-dimensional matrix. The LEDs are arranged in rows and columns. A first shift register is provided for driving the LEDs along the rows and a second shift register is provided for driving the LEDs along the columns. Information is stored in the shift registers to effectuate selective driving of selected ones of the LEDs.

In accordance with one feature of the present invention, the driving circuit includes means for selectively applying driving currents of various amplitudes to the LEDs so that the LEDs display selected colors.

In accordance with another feature of the present invention, means is provided for varying the pulse widths of the driving current pulses to selectively vary the intensity of the display.

The above and other features of this invention will be more fully understood from the following detailed description and the accompanying drawings, in which.

Figure 1:
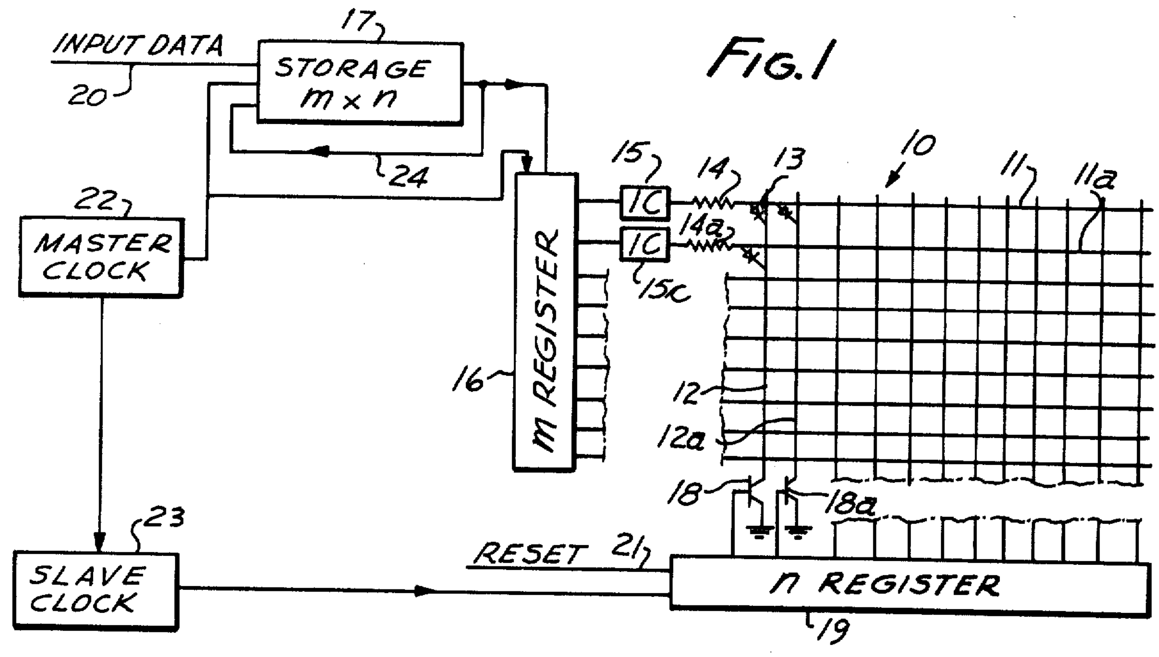
FIG. 1 is a schematic block diagram of a LED display matrix having a driving circuit in accordance with the presently preferred embodiment of the present invention.

Referring to FIG. 1 there is illustrated a matrix 10 having m number of leads 11, 11*a*, etc. arranged in rows and n number of leads 12, 12*a*, etc. arranged in columns. Leads 11 and 12 are electrically isolated, and are interconnected by a matrix of $m\ n$ number of light emitting diodes 13. For example, the anode of each diode 13 may be connected to a respective lead 11 while the cathode of the diode may be connected to a respective lead 12. Leads 11, 11*a*, etc. are connected through resistors 14, 14*a*, etc. and integrated circuits 15, 15*a*, etc. to individual outputs of *m* register 16. The input for register 16 is connected to the output of shift register 17. Leads 12, 12*a*, etc. are connected through transistors 18, 18*a*, etc. to ground, the base of each transistor 18 being connected to a separate output of *n* register 19. As will be more fully understood hereinafter, circuit 15 may consist of suitable amplifiers or driving circuits for color and brightness control, such as the circuits illustrated in FIGS. 4 and 5.

Register 19 is a shift register capable of sequencing enable signals to the various outputs of the register. Shift register 19 has a first input 21 for resetting the register and to condition operation of the first transistor 18. A second input is connected to slave clock 23 to sequence an enable signal to the outputs of register 19 to sequentially operate transistors 18, 18*a*, etc. Register 17 has an input 20 for supplying data to register 17. The input data may be supplied by means (not shown) which develops the input signals in accordance with data to be displayed. The input data to register 17 includes at least one bit for each LED device in matrix 10. As will be more fully understood hereinafter, the input may include more than one bit per LED device to achieve color and intensity control.

Master clock 22, which, as will be more fully explained hereinafter is a gated clock, is connected to one input of storage register 17 and shift register 16, and is connected to an input of slave clock 23. The output of clock 23 is connected to an input of shift register 19. As illustrated in FIG. 1, storage register 17 includes a feed-back path 24 connecting the output of the storage register to its input.

Figure 2:
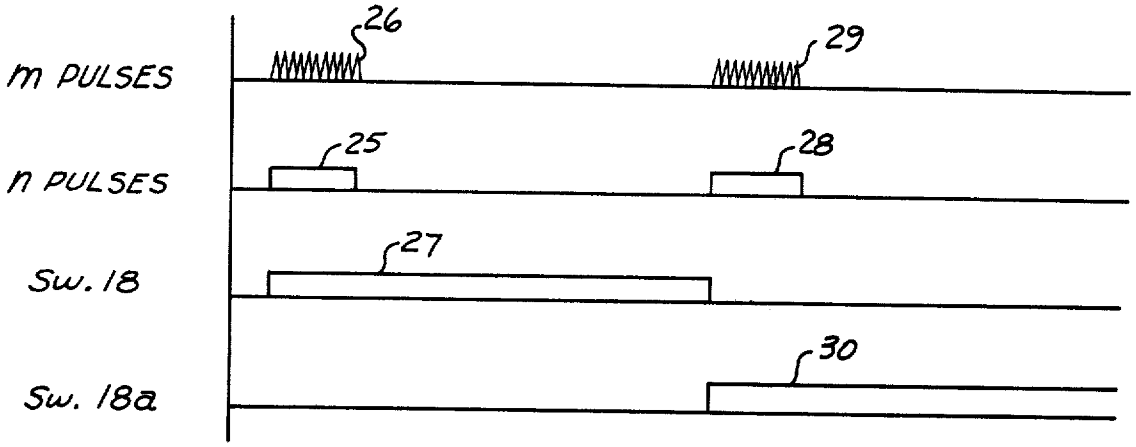
FIG. 2 is a diagrammatic representation of waveforms associated with the driving circuit illustrated in FIG. 1.

With reference to FIG. 2, the operation of the driving circuit illustrated in FIG. 1 may be explained. Light emitting diodes 13 are connected between each lead 12 and each lead 11 so that connection is made from the *m* register 16 through the light emitting diodes 13 and transistors 18 to ground. Input data is supplied to storage register 17. The input data to register 17 comprises at least $m\ n$ number of bits of information, where *m* is equal to the capacity of register 16 and *n* is equal to the capacity of register 19. As will be more fully understood hereinafter, the input data may include some multiple of $m\ n$ bits for color and intensity control. With an *m* by *n* matrix 10, the input data to storage register 17 corresponds in length to some multiple of the number of diodes in matrix 10.

Master clock 22 is a gated clock capable of producing *xm* pulses 26 (FIG. 2), where *m* is the number of outputs of *m* register 16 and *x* is the number of bits associated with color and intensity circuits, if any. Upon completion of generation of *xm* pulses, clock 22 is gated off for some predetermined period of time. For example, clock 22 may include a counter (not shown) adapted to count *xm* pulses generated by the clock. The counter may trigger a timer (not shown) which gates off clock 22 for a predetermined period of time. At the end of the predetermined period of time, the timer and counter may be reset and the clock operated to produce another *xm* pulses.

Input data is supplied to storage register 17 via input 20. The input data will consist of *xmn* bits, where *n* is the number of outputs of register 19. With each *xm* clock pulses from clock 22, *xm* data bits will be forwarded to shift register 16 for storage therein. Since clock 22 is a gated clock which stops for a period of time after each *xm* pulses, the *xm* data bits in register 16 will be stored therein until clock 22 is restarted.

Master clock 22 also drives slave clock 23 to produce a single pulse 25 (FIG. 2) for each *xm* pulses produced by clock 22. Conveniently, the pulse 25 may have a period equal to the period of the *xm* pulses.

The binary value of each bit of information stored in *m* register 16 operates through integrated circuit 15 to control the current on each of leads 11. The presence of the *n* pulse to the input of *n* register 19 conditions the first transistor 18 to conduct. Hence, current flows through integrated circuits 15, through the light emitting diodes, and transistor 18 in accordance with the binary value of the signals stored in register 16. For example, if eight rows 11 are connected to register 16, and if no color or intensity circuits are associated with integrated circuits 15 (so $x = 1$), the *xm* code will consist of 8 bits. Each 1 bit in the code stored in register 16 will supply sufficient current to condition the diodes connected to the respective row leads to conduct, whereas those diodes receiving a 0 bit will not be conditioned to conduction. Energization of a selected transistor 18 for each column will complete the conduction path for the LEDs so that those LEDs associated with the 1's from register 16 and associated with the particular column 12 will be energized.

Assuming, for example, that the display is to be in single color and single intensity ($x = 1$), during the first *n* pulse 25, *m* pulses 26 are stored into register 16. Pulse 25 also conditions register 19 to provide an output to transistor switch 18 to complete a path for all diodes in the first column. The period of conduction for transistor 18 is shown at 27 in FIG. 2 and is long compared to pulse 25. The LEDs remain on during the remainder of pulse 27, at which time clock 22 conditions a new set of *m* pulses 29 to be stored in register 16. At the same time, clock 22 drives clock 23 to condition shift register 19 to shift to its second output to operate transistor switch 18*a*. Transistor 18*a* conducts for the period illustrated at 30 in FIG. 2.

If during the first *n* pulse, the *m* pulse pattern is 11010110 and the integrated circuits are condition to respond to only the 1's of the code, it is evident that the first, second, fourth, sixth and seventh LEDs of the first column will be energized. If during the second *n* pulse, the *m* pulse pattern is 00111010, it is evident that the third, fourth, fifth and seventh LEDs of the second column will be energized. The pattern continues through the entire cycle of *n* register 19. The *mn* pulses are recycled through register 17 via loop 24 several times. By maintaining each cycle sufficiently short, and by recycling the pulses a sufficient number of times over a sufficient period of time, the operated LEDs of the matrix will appear, to the human eye, to be conducting at the same time.

Summarizing the operation of the apparatus shown in FIG. 1, register 16 is loaded with *m* pulses. When register 16 is fully loaded, master clock 22 stops, so that all the outputs from register 16 remain unchanged for the duration of the time interval between the series of *m* pulses 26 and the series of *m* pulses 29. The LEDs are energized and provide a display during this period of time. It should be noted that although transistor 18 is conducting during the period of register 16, the LEDs produce no visual effect due to the shortness of each *m* pulse 26. Alternatively, the gate pulse 25 which operates transistor 18 may occur at the end of each series of *m* pulses, or circuits 15 could be gated off during the pulse 25 so that the outputs from *m* register 16 are not delivered to the matrix until the register is fully loaded.

Figure 3:
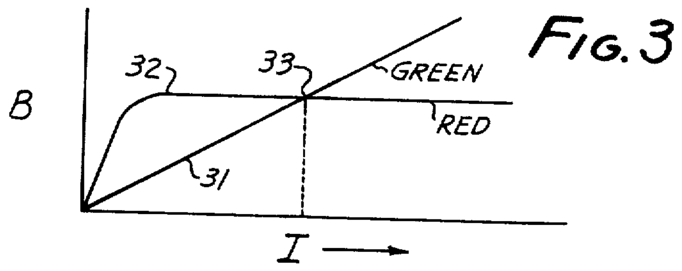
FIG. 3 is a diagram illustrating the color display characteristics of a light emitting diode.

One feature of the present invention resides in the utilization of the color emitting capabilities of certain light emitting diodes. For example, gallium phosphide light emitting diodes available from Bowmar Canada, Ltd., when subjected to a low current emit a predominantly red light. However, when subjected to a relatively high current, such diodes emit a predominantly green light. The brightness of the red and green hues is illustrated in FIG. 3 as a function of current. At low currents, the red hue, illustrated by waveform 32 is predominate over the green hue, illustrated by waveform 31, whereas at high current the green hue predominates. At cross-over point 33, the hues are about equal and will blend to appear as yellow.

Figure 4:
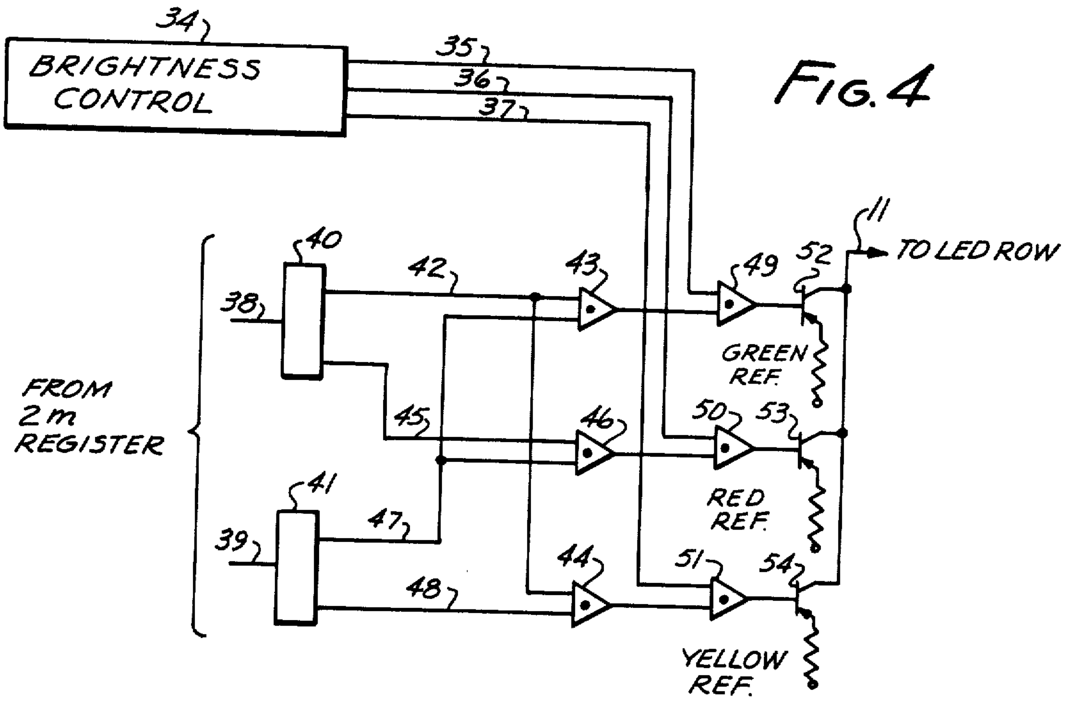
FIG. 4 is a schematic block diagram of a logic circuit for color control of light emitting diodes in accordance with one embodiment of the invention.
Figure 5:
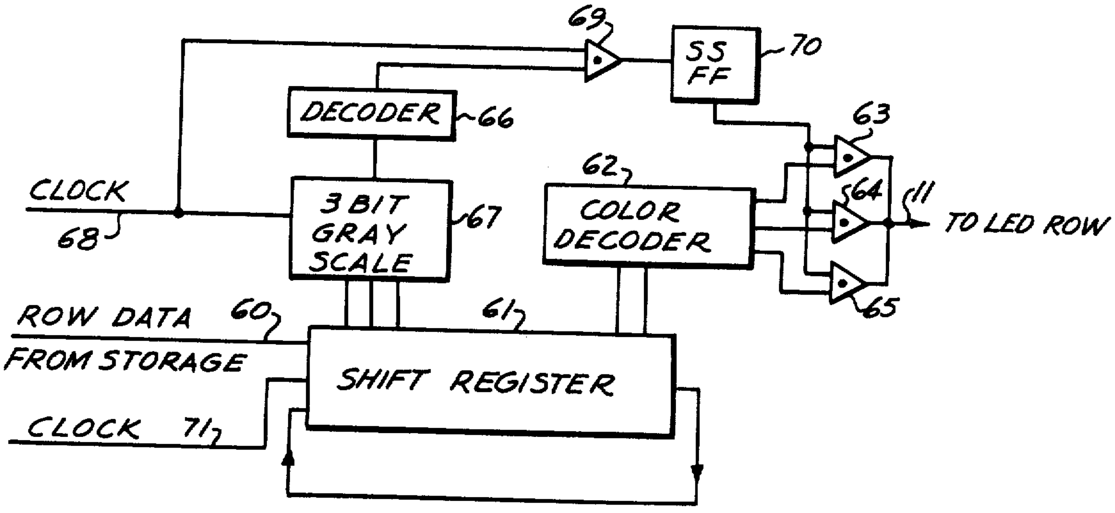
FIG. 5 is a block logic diagram of a color driving circuit for controlling the intensity and the color of display of light emitting diodes in accordance with another embodiment of the invention.

FIGS. 4 and 5 relate to driving circuits to take advantage of the color phenomenon for selective color display from LED matrices. The circuits illustrated in FIGS. 4 and 5 may be used for integrated circuits 15 in FIG. 1. In FIG. 4, brightness control circuit 34 has output leads 35, 36 and 37. As will be fully understood hereinafter, brightness control 34 provides pulses of different pulse widths on the output leads 35, 36 and 37. Input leads 38 and 39 are connected to a shift register having a length equal to 2 *m*, since $x = 2$ to provide for conditions for each LED, three colors and off. For example, the shift register to which leads 38 and 39 are connected is similar to register 16 illustrated in FIG. 1 but so arranged so that two bits of information will operate on the circuit illustrated in FIG. 4. Lead 38 provides an input to bistable multivibrator 40, and lead 39 provides an input to multivibrator 41. Multivibrators 40 and 41 each have two outputs, output 42 of multivibrator 40 being connected to an input of AND gates 43 and 44, output 45 of multivibrator 40 being connected to one input of AND gate 46, output 47 of multivibrator 41 being connected to inputs of AND gates 43 and 46, and output 48 of multivibrator 41 being connected to the second input of AND gate 44. AND gate 49 has inputs connected to the output lead 35 from brightness control circuit 34 and to the output from AND gate 43, AND gate 50 has inputs connected to the output 36 of brightness control circuit 34 and to the output of AND gate 46, and AND gate 51 has inputs connected to output lead 37 from brightness control circuit 34 and to the output from AND gate 44. Each of AND gates 49, 50 and 51 are connected to the base of respective transistors 52, 53 and 54. The emitters of transistors 52, 53 and 54 are connected to respective sources (not shown) of constant voltage through resistors, and the collectors of transistors 52, 53 and 54 are connected together to lead 11 of the particular LED row. The driving currents established by the voltage sources and series resistors are different for each transistor 52, 53 and 54. For example, the source connected to the emitter of transistor 52 may produce a relatively high current for green displays, the source connected to emitter of transistor 53 may produce a relatively low current for red displays, and the source connected to the emitter of transistor 54 may produce an intermediate current for yellow displays.

The brightness of a particular LED is determined by the current applied to that diode, which also affects the color hue. However, the "apparent" brightness of such diodes, as perceived by the human eye, is determined by the length of time that the diode is emitting light, as well as actual brightness. Hence, if it is desirable to provide an apparent bright display of red colors, brightness control circuit 34 provides pulses of longer duration on output lead 36 than the pulses on the leads 35 and 37. On the other hand, if it is desired that all colors have substantially the same apparent brightness, the length of pulses applied to each lead 35-37 is inversely proportioned to the pulse amplitude so that the average current to each lead is substantially the same. However, the pulse lengths may be adjusted somewhat to compensate for the differing efficiency of the human eye for different colors.

In operation of the color driving circuit illustrated in FIG. 4, input signals representative of 1's and 0's are applied to input leads 38 and 39. Multivibrators 40 and 41 provide output signals at one or the other of their outputs depending on the binary value of the input signals. For example, if the input signal to lead 38 is a 1, multivibrator 40 will provide an output at lead 42, where as if the input lead 38 is a 0, multivibrator 40 will provide an output at lead 45. Likewise, multivibrator 41 will provide an output at lead 47 if its input is a 1, and will provide an output at lead 48 if its input is a 0. AND gates 43, 44 and 46 are arranged so that a 11 condition will operate through AND gate 49 to operate transistor 52, whereas a 01 code will operate transistor 53 and a 10 code will operate transistor 54. A 00 code will not operate any of the transistors. Selective operation of transistors 52, 53 and 54 provides selective current control to the LED row. If a 11 code is applied to leads 38 and 39, gate 49 is operated for a period of time determined by the pulse length on lead 35 to operate transistor 52 to apply a relatively high current from the current source to LED row 11. If a 01 code is applied to the input, transistor 53 is operated to drive LED row 11 with a relatively low current for a period of time determined by the pulse length on lead 36. An intermediate current is applied to row 11 upon operation of AND gate 51 and transistor 54 for a period of time dependent on the pulse length on lead 37.

FIG. 5 illustrates another color driving circuit which provides both a color decoding system as well as automatic control of the brightness of the particular LED being operated. In FIG. 5, information from the storage register, such as storage register 17 in FIG. 1 is forwarded via channel 60 to shift register 61. The code for each LED row includes a 5 digit binary code, the first three bits providing the brightness code, and the last two bits providing the color code. The brightness code is capable of selecting seven levels of brightness, as well as an off condition. Color decoder 62 is connected to shift register 61 to receive the two bits representative of the color code. Color decoder 62, which may be similar to that illustrated in FIG. 4, decodes the two bit color code and provides an output to a selected one of AND gates 63, 64 and 65. The output of AND gates 63, 64 and 65 are connected to lead 11 of the LED row being operated.

Decoder 66 is connected to the output of register 67 which in turn is connected to receive the three bit brightness code from shift register 61. Register 67 operates on the brightness, or gray scale code, by stepping the code until a 111 code is reached. The stepping occurs at a rate dependent upon the rate of clock pulses on lead 68. Decoder 66 will provide an output pulse for each pulse necessary to step the gray scale code to a 111 condition. Decoder 66 is connected to AND gate 69 which, in turn, is connected to monostable multivibrator 70. The output of monostable multivibrator is connected to a second input of each of AND gates 63, 64 and 65.

In operation of the apparatus illustrated in FIG. 5, a five bit code is applied to shift register 61 in accordance with a signal from the data storage over lead 60. The input signal is clocked into register 61 via lead 71. Two of the bits of the code are decoded by color decoder 62 to selectively enable one of AND gates 63, 64 and 65. AND gates 63, 64 and 65 include current driving means (not shown in FIG. 5) for deriving separate driving currents for each AND gate. For example, AND gates 63-65 may include transistor switch means and separate current sources as described and illustrated in connection with FIG. 4. In the even that gate 63 is operated, a relatively high current is supplied to the LED row so that the LEDs will emit a green color. If AND gate 64 is operated, a relatively low current is provided to lead 11 so that the LEDs will provide a red display. If AND gate 65 is operated, an intermediate current is provided to lead 11 to provide a yellow display. The duration of operation of a particular AND gate 63, 64 and 65 is determined by register 67, decoder 66 and monostable multivibrator 70.

Decoder 66 decodes the three bit gray scale code by stepping the code to a 111 condition and providing output pulses for each step. For example, if the three bit gray scale code is 110, clock 68 operates on register 67 only once to step the code to 111. Hence, a single pulse is passed by decoder 66 to AND gate 69 and thence to monostable multivibrator 70. Multivibrator 70 is operated once to provide a single pulse, whose duration is determined by the time constant of the multivibrator, to the operated AND gate 63-65. Hence, the selected AND gate 63-65 (selected by the color code) is operated during the single pulse to provide a current output of selected magnitude and selectively short duration. However, if the gray scale code is 000, clock 68 must step through seven cycles to shift register 67 to its 111 position. The seven pulses are passed through decoder 66 and AND gate 69 to monostable multivibrator 70 to operate the monostable multivibrator 70 seven times to provide seven successive pulses to the operated AND gate. The LEDs operated on the LED row 11 are operated for seven successive pulses to provide the appearance of a relatively long duration of "on" condition. Hence, the display is perceived by a human as being brighter utilizing a greater number of successive pulses in the decoded gray scale code as opposed to less numerous pulses. (A 111 input code will not be stepped, so multivibrator 70 will not be operated. Hence, a 111 input code represents an "off" condition for the particular LED row.)

The apparatus illustrated in FIG. 5 is particularly advantageous where it is desirable to selectively control the apparent brightness of a display. For example, in the event that it is desirable to provide a warning indication, it may be desirable to display such warning in a red color and with a relatively intense brightness. With the apparatus illustrated in FIG. 5, it is possible to operate the LEDs from a relatively low intensity green display to a relatively high intensity red display merely by altering the code from the computer storage memory.

The present invention thus provides apparatus for driving LEDs for selective brightness as well as selective color. The apparatus is effective in operation and provides a wide variety of uses.

This invention is not to be limited by the embodiments shown in the drawings and described in the description, which are given by way of example and not of limitation, but only in accordance with the scope of the appended claims.

What is claimed is:

1. Apparatus for driving selected ones of *m* times *n* light emitting diodes where *m* and *n* are whole numbers, comprising: first register means having at least *m* outputs and second register means having *n* outputs, each output of said first register means being connected to one side of one diode in each of *n* mutually exclusive groups of diodes and each output of said second register means being connected to the other side of one diode in each of *m* mutually exclusive groups of diodes, each diode being in one of said groups of *m* diodes and in one of said groups of *n* diodes; storage means connected to said first register means for storing at least *m* times *n* bits representative of information to be displayed, said storage means having a feedback path for recycling *m* times *n* bits, first clock circuit means connected to said storage means and to said first register means, said first clock circuit means generating at least *m* clock pulses for controlling transfer from said storage means of successive binary codes containing at least *m* bits of data to said first register means for conditioning selected groups of said *m* groups of diodes for conduction, means for gating said first clock circuit means off for a predetermined period of time after generation of at least *m* clock pulses, and second clock circuit means driven by and responsive to said first clock circuit means and connected to said second register means, said second clock circuit means generating a single clock pulse substantially equal in duration to the total period of *m* clock pulses generated by said first clock circuit means for conditioning a group of said *n* groups of diodes for conduction, diodes existing in both the selected groups of *m* diodes and the selected group of *n* diodes being operated for said predetermined period of time, said first and second clock circuit means restarting after said predetermined period of time and recycling said storage means *m* times *n* bits to repeat the pattern of operating said diodes.

2. Apparatus according to claim 1 wherein said first register means includes *m* current source means connected to respective outputs of said first register means, each of said current source means being conditioned by said first register means to provide a predetermined current to the diodes of a respective group of *n* diodes.

3. Apparatus according to claim 2 wherein said second register means includes *n* switch means connected to respective outputs of said second register means, each of said switch means providing a current path between the diodes of the respective group of *m* diodes and said current source means.

4. Apparatus according to claim 2 wherein said diodes are characterized by emitting predominantly different color hues when driven by respectively different currents, and wherein each of said current source means includes a plurality of current sources each adapted to supply a current of mutually different predetermined magnitudes, and means responsive to the binary code in said first register means for selectively connecting on of said current sources to the respective group of *n* diodes.

5. Apparatus according to claim 4 wherein the binary code transferred to said first register means contains at least 2 *m* bits, and each of said current source means includes decoder means for decoding 2 bits of said binary code in said first register means to selectively operate said current sources.

6. Apparatus according to claim 4 further including brightness control means for operating said current sources for a predetermined period of time.

7. Apparatus according to claim 6 wherein said brightness control means comprises means responsive to a predetermined code in said first register means for controlling the duration of time that current from the selected current source is applied to the respective group of *n* diodes.

8. Apparatus according to claim 6 wherein said binary code transferred to said first register means contains at least 5 *m* bits, said current source means including first decoder means for decoding 2 of said bits to selectively operate said current sources and said brightness control means including second decoder means for decoding 3 of said bits for selectively controlling the duration of operation of said selected diodes.

9. Apparatus according to claim 1 wherein said first register means produces *x m* output bits, *m* number of circuit means each responsive to mutually exclusive *x* number of bits for producing driving currents each having a current amplitude dependent upon the bit pattern of said respective *x* number of bits, and means connecting each of said circuit means to respective ones of said groups of *n* diodes.

10. Apparatus according to claim 9 wherein each of said circuit means is responsive to a respective *x* number of bits to produce a driving pulse having a current amplitude and a time duration dependent upon the bit pattern of said respective *x* number of bits.

* * * * *